United States Patent [19]
Hamaguchi et al.

[11] 3,753,278
[45] Aug. 21, 1973

[54] SOLDER COATED WIRE

[75] Inventors: Hachiro Hamaguchi; Misao Sakashita; Mamoru Koyama, all of Osaka-shi, Japan

[73] Assignee: Tatsuta Electric Wire & Cable Co., Ltd., Osaka City, Japan

[22] Filed: Nov. 18, 1971

[21] Appl. No.: 200,044

Related U.S. Application Data

[62] Division of Ser. No. 22,016, March 23, 1970, Pat. No. 3,644,115.

[52] U.S. Cl. .................................... 29/197, 29/194
[51] Int. Cl. ........................ B32b 15/02, B32b 15/20
[58] Field of Search ...................... 75/134 B, 166 D, 75/175 R; 29/197, 194

[56] References Cited

UNITED STATES PATENTS

| | | | |
|---|---|---|---|
| 1,161,612 | 11/1915 | Cayocca | 75/175 R |
| 1,533,118 | 4/1925 | Kelly et al. | 75/175 R |

*Primary Examiner*—L. Dewayne Rutledge
*Assistant Examiner*—E. L. Weise
*Attorney*—E. F. Wenderoth, V. M. Creedon et al.

[57] ABSTRACT

Tin-lead alloys used for soldering and plating metal wires are improved in their resistance to oxidation when they contain a small amount of aluminum.

1 Claim, No Drawings

SOLDER COATED WIRE

This is a divisional of application Ser. No. 22,016, filed Mar. 23, 1970, now U.S. Pat. No. 3,644,115, dated Feb. 22, 1972.

The present invention relates to an improvement in soldering filler metals and, more particularly, to a tin-lead solder alloy wherein a small amount of aluminum is added so as to impart the resistance against oxidation thereto. Inasmuch as the improved tin-lead solder alloy of the present invention concerns, the present invention also relates to a metal wire plated therewith in a plating bath whereby resistance against oxidation is imparted to said metal wire.

It has been known in the art that solders used in metal plating and soldering processes are susceptible to oxidation in their molten state in the air. If no attention is paid to this fact during the soldering or plating operation, an oxide layer is formed on the deposited solder or on the solder plated surface of a metal wire or the like.

In the case where a metal wire or the like article is to be plated with solder alloy by immersing it in a plating bath containing therein molten solder alloy, an oxide film should not be formed on the surface of molten solder alloy in the plating bath, or otherwise the final plating on the wire or the like article is disadvantageously affected. Thus, when the oxide film is formed on the molten surface it has been a common practice to remove the oxide film by sweeping off or by overflowing the molten solder alloy in the plating bath so as to maintain the molten surface in the fresh state throughout the plating operation.

This is particularly true of the case where an electric circuit-wiring printed base for use in electric instruments or appliances is soldered or solder plated.

The solder plated wire is largely employed as a lead wire in electronic instruments because of its favorable solderability. Most such plated lead wires to be connected with electric parts such as resistors and condensors are coated with synthetic resin. In this instance, since the coating process is performed under an elevated temperature for a relatively long time, there has been a tendency that the deposited solder alloy is remolten and the deposited solder alloy is oxidized resulting in reduction of the solderability.

In order to overcome the above-mentioned problem, wire plated with high-temperature solder alloy has been employed. However, no provision for preventing the solder plated wire from being oxidized has been made even for high temperature solder plated wire.

Therefore, it is an object of the present invention to provide an improved oxidation-resistant solder alloy comprising aluminum in the amount of about 0.005 to 0.2 weight percent, tin in the amount of 0.2 to 99 weight percent, and lead in the amount of the remaining weight percent, wherein resistance against oxidation is imparted to an extent that, even if it is in its molten condition, or at a high temperature slightly lower than the melting point thereof, an oxide film is hardly formed on the surface of the deposited solder.

It is another object of the present invention to provide a metal wire plated with an improved solder alloy, said improved solder alloy comprising aluminum in the amount of about 0.005 to 0.2 weight percent, tin in the amount of about 0.2 to 99 weight percent, and lead in the amount of the remaining weight percent, wherein the resistance against the oxidation is imparted to an extent that, even if the solder plated wire is exposed in the air at the high temperature for a relatively long time, good solderability is maintained. However, for this purpose, it is preferred that the percentage of aluminum not exceed about 0.1 percent, the other limits being as stated above.

The solder alloys of the present invention can be obtained by adding a small amount of aluminum in the tin-lead mixture during the manufacturing process.

The present invention will be hereinafter fully described by way of example.

EXAMPLE I

Lead and aluminum were mixed by fusion at the temperature of about 800°C to yield a lead-aluminum containing aluminum in the amount of 0.5 percent by weight.

The alloy thus obtained was added with lead and tin in their respective fused state to give the oxidation free tin-lead solder alloys of the present invention, the composition of each of which was numbered 1 to 22 in Table I.

In Table I, the composition of each of the tin-lead alloys which do not contain aluminum was also tabulated, but not numbered, for the purpose of comparison in respect of the formation of an oxide film on the surface of the molten solder alloys under the conditions as referred to in Table I.

It should be noted that the amount of aluminum added is based on the weight percentage relative to the total weight of each tin-lead solder alloy. And, in Table I, * indicates the time necessary for the oxide film to appear on at least a portion of the surface of each molten solder alloy while ** indicates the time necessary for the oxide film to appear on the entire surface thereof.

According to Table I, it will be clearly understood that the features of the present invention can be attained when the amount of aluminum added equals and exceeds 0.005 weight percent. However, though the maximum amount thereof is preferably restricted to not more than 0.2 weight percent, even if it exceeds 0.2 weight percent, oxidation prevention effects can be obtained. The reason for the 0.2 limit is that excess over 0.2 weight percent may cause problems in respect of workability and others.

Therefore, according to the present invention, the improved solder alloy has not only good resistance against oxidation when molten, but also is hardly susceptible to oxidation even if exposed to the air for a much longer time under a temperature slightly lower than the melting point thereof. This fact implies that, even when the solidified solder alloy of the present invention is subsequently subjected to a heat treatment process, no oxide film is formed on the surface thereof with reduction of its solderability.

EXAMPLE II

With the use of the improved solder alloys numbered 5 and 15 in Table I, namely, one improved solder alloy consisting of 85% lead and 15% tin having added thereto aluminum in the amount of 0.005 weight percent relative to the total weight of lead and tin and the other consisting of 60% lead and 40% tin having added thereto aluminum in the amount of 0.1 weight percent relative to the total weight of lead and tin, copper wires of 0.7 mm in diameter were plated in accordance with the ordinary plating method.

For the purpose of comparison, two conventional tin-lead solder alloys, one consisting of 85% lead and 15% tin and the other consisting of 60% lead and 40% tin, were plated on the same wires in the same manner.

The copper wires applied with the improved solder alloys and the conventional solder alloys were heated to the specified temperatures in the air. The results of this test in respect to resistance against oxidation and solderability are tabulated in Table II.

In respect to workability, there were found no differences between applications of the solder alloys with aluminum added and the solder alloys without aluminum while the finish of wires plated with each of the solder alloys with aluminum added was superior to that of each of the solder alloys without aluminum.

Alternatively, a plating of conventional solder alloy may be formed on the peripheral surface of a copper wire before a secondary plating of the improved solder alloy is formed thereon.

In general, an increase in the lead content tends to permit a decrease in the aluminum content but an increase in the tin content makes it preferable to increase the amount of aluminum.

As herein fully disclosed, in the case where solder plating is intended with the use of the solder alloys of the present invention, the cleaning of the surface of molten solder alloys in a plating bath is eliminated or lessened. In addition, excellent resistance against oxidation is imparted to the solder plated material.

Thus, the present invention can be advantageously applied in the art concerned.

TABLE I

| | Composition of solder alloys (wt. percent) | | Amount of aluminum added (wt. percent) | Heating conditions | | | |
|---|---|---|---|---|---|---|---|
| | | | | Liquidus line plus 50° C. | | Liquidus line plus 75° C. | |
| | Pb | Sn | | Time A* (second) | Time B** (second) | Time A* (second) | Time B** (second) |
| / | 95 | 5 | 0 | 5 | 40 | 4 | 32 |
| 1 | 95 | 5 | 0.005 | 6 | 43 | 5 | 35 |
| 2 | 95 | 5 | 0.01 | 125 | 368 | 122 | 250 |
| 3 | 95 | 5 | 0.1 | >7,200 | >7,200 | >7,200 | >7,200 |
| 4 | 95 | 5 | 0.15 | >7,200 | >7,200 | >7,200 | >7,200 |
| / | 85 | 15 | 0 | 7 | 50 | 5 | 42 |
| 5 | 85 | 15 | 0.005 | 19 | 228 | 14 | 157 |
| 6 | 85 | 15 | 0.01 | 813 | 1,297 | 621 | 1,093 |
| 7 | 85 | 15 | 0.1 | >7,200 | >7,200 | >7,200 | >7,200 |
| 8 | 85 | 15 | 0.15 | >7,200 | >7,200 | >7,200 | >7,200 |
| / | 70 | 30 | 0 | 9 | 48 | 5 | 38 |
| 9 | 70 | 30 | 0.005 | 30 | 110 | 21 | 88 |
| 10 | 70 | 30 | 0.01 | 748 | 1,125 | 605 | 989 |
| 11 | 70 | 30 | 0.1 | >7,200 | >7,200 | >7,200 | >7,200 |
| 12 | 70 | 30 | 0.15 | >7,200 | >7,200 | >7,200 | >7,200 |
| / | 60 | 40 | 0 | 8 | 48 | 6 | 45 |
| 13 | 60 | 40 | 0.005 | 25 | 172 | 15 | 130 |
| 14 | 60 | 40 | 0.01 | 645 | 908 | 498 | 851 |
| 15 | 60 | 40 | 0.1 | >7,200 | >7,200 | >7,200 | >7,200 |
| 16 | 60 | 40 | 0.15 | >7,200 | >7,200 | >7,200 | >7,200 |
| / | 50 | 50 | 0 | 325 | 747 | 33 | 94 |
| 17 | 50 | 50 | 0.1 | >7,200 | >7,200 | >7,200 | >7,200 |
| 18 | 50 | 50 | 0.15 | >7,200 | >7,200 | >7,200 | >7,200 |
| / | 38 | 62 | 0 | 501 | 1,232 | 181 | 312 |
| 19 | 38 | 62 | 0.1 | >7,200 | >7,200 | >7,200 | >7,200 |
| 20 | 38 | 62 | 0.15 | >7,200 | >7,200 | >7,200 | >7,200 |
| / | 15 | 85 | 0 | 25 | 43 | 7 | 21 |
| 21 | 15 | 85 | 0.1 | >7,200 | >7,200 | >7,200 | >7,200 |
| 22 | 15 | 85 | 0.15 | >7,200 | >7,200 | >7,200 | >7,200 |

TABLE II

| Composition of solder alloys (wt. percent) | | Amount of aluminum added (wt. percent) | Testing conditions and results | | | |
|---|---|---|---|---|---|---|
| Pb | Sn | | 170° C. 4 hours | 200° C. 2 hours | 230° C. 1 hour | 260° C. 0.5 hour |
| 85 | 15 | 0 | Appearance: No color change; solderability: Excellent. | Appearance: Slightly black; Solderability: Good. | Appearance: Black; Solderability: Unfavorable. | Appearance: Black; Solderability: Unfavorable. |
| 60 | 40 | 0 | Appearance: No color change; Solderability: Excellent. | Appearance: Slightly black; Solderability: Good. | ------------ | |
| 85 | 15 | 0.005 | Appearance: No color change; Solderability: Excellent. | Appearance: No color change; Solderability: Excellent. | Appearance: No color change; Solderability; Excellent. | Appearance: Dark; Solderability: Excellent. |
| 60 | 40 | 0.1 | Appearance: No color change; Solderability: Excellent. | Appearance: No color change; Solderability: Excellent. | ------------ | |

NOTE.—The amount of aluminum added is the weight percent relative to the total weight of lead and tin.

We claim:

1. A metal wire plated with solder alloy, said alloy consisting essentially of aluminum in the amount of about 0.005 to 0.1 weight percent, tin in the amount of 0.2 to 99 weight percent, the remaining metal being lead.

* * * * *